May 19, 1942.  M. GERLACH ET AL  2,283,432
PISTON AND PISTON RING
Filed Sept. 9, 1940

Inventors
Manfred Gerlach,
Walter Gerecke,
Attorneys

Patented May 19, 1942

2,283,432

UNITED STATES PATENT OFFICE 2,283,432

PISTON AND PISTON RING

Manfred Gerlach, Ak-En-on-the-Elbe, and Walter Gerecke, Dessau, Germany, assignors to Junkers Flugzeug-und-Motorenwerke A. G., Dessau, Germany, a corporation of Germany Application September 9, 1940, Serial No. 356,082
In Germany July 12, 1939

9 Claims. (Cl. 309—33)

This invention is directed to piston rings for the pistons of internal combustion engines. More particularly the invention is directed to the sealing ring on the piston which is nearest the end of the piston facing the combustion chamber. This sealing ring is the so-called fire ring of the piston.

In the construction of piston rings, the fire ring is a closed non-split ring which must be initially fitted to the piston, and must be replaceable. Heretofore pistons have been constructed of a plurality of parts so that the piston could be taken apart in order to insert or replace the fire ring. Obviously a piston composed of a number of parts is complicated and not as desirable as a single piece piston. The latter type pistons known to the prior art could not be provided with closed fire rings inasmuch as no means was known for assembling a closed fire ring with such singlepiece pistons.

An object of this invention is to produce a single unit piston construction to which a fire ring can be affixed and replaced.

Another object of the invention is to produce a novel piston construction to which a closed fire ring can be affixed and locked in place.

Another object of the invention is to produce a piston to which a closed fire ring can be added by temporary deformation of either the piston or the fire ring.

Another object of the invention is to produce a piston construction to which a closed fire ring can be added without taking the piston apart.

Generally these objects of the invention can be obtained by several different constructions in which one member is temporarily deformed to the configuration of the other. For example, the piston can be given a special shape so that the fire ring can be elastically deformed within its elastic limits to slip over the piston and become locked thereto when the ring returns to normal shape. Thus the piston head is given an oblong shape and separated from the piston body by a circular groove. A circular fire ring can be deformed within its elastic limits to an oblong shape and slipped over the oblong head where it will be locked in the groove when the deforming force is removed. Alternately the piston ring can be given a special shape so as to be fitted to the piston when deformed, and then locked with the piston when returned to normal shape.

In a second form of the invention, the piston head can be provided with a resilient skirt with the fire ring holding groove lying between the skirt and the piston body. The closed fire ring can be snapped over the skirt and locked into place within the groove.

The means by which the objects of this invention are obtained are more fully described with reference to the accompanying drawing in which.

Figure 1:
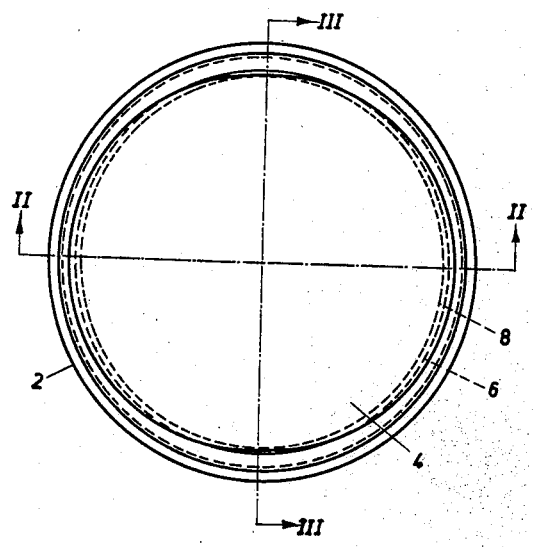
Fig. 1 is a top plan view of a piston constructed according to one form of the invention.
Figure 2:
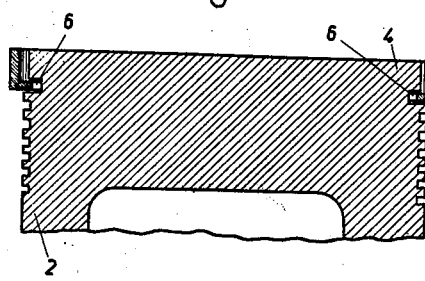
Fig. 2 is a cross sectional view on the line II—II of Fig. 1.
Figure 3:
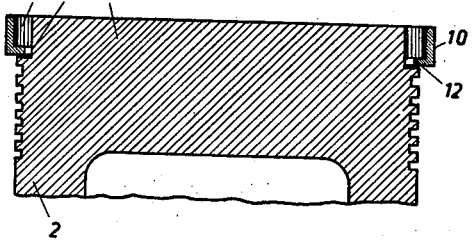
Fig. 3 is a cross sectional view on the line III—III of Fig. 1.

In Figs. 1 to 3, the piston body 2 is provided with an oblong head portion 4 separated from the piston body by a circular groove 6. Portion 4 may be considered a part of the piston itself, or may be considered as a separate plate portion for shielding the piston from the combustion chamber. As more clearly seen in Fig. 1, head portion 4 is of elliptical shape with the major axis lying along section line II—II, and the minor axis lying along section line III—III. Piston body 2 is circular in section as is conventional, and groove 6 is likewise of circular form with its diameter being approximately equal to or slightly less than the length of the minor axis of the elliptical shaped head portion 4.

A closed non-split fire ring 8 composed of an annulus 10 and an inwardly turned flange portion 12, is adapted to be seated upon the piston body with the flange 12 engaged in the groove 6 to fix the fire ring in place upon the piston. It is readily apparent that fire ring 8 can be fitted upon the piston by deforming the annulus 10 and flange 12 so that they assume an elliptical shape corresponding to the shape of the head portion 4 whereupon the fire ring is slipped over the head portion, the deforming force released, and the flange 12 engaged beneath the overhanging portions of the upper part 4. Of course, the fire ring 8 is only deformed within its elastic limit so that it resumes its original shape as soon as the deforming pressure is released. Consequently fire ring 8 is affixed to a one-piece piston, and no portion of the piston has to be removed in order to replace fire ring 8. The fire ring is positively held in place, and is also adjustable with respect to the piston body.

Figure 4:
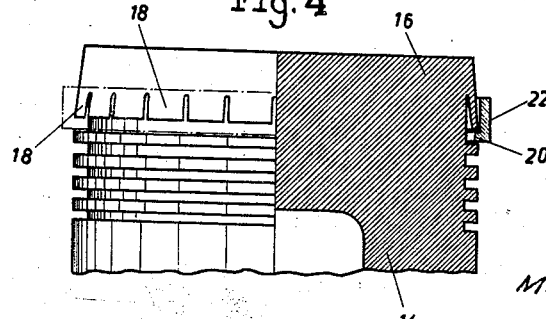
Fig. 4 is a side elevational view, partly in section of a modified form of the invention.

In the embodiment of the invention as shown in Fig. 4, piston body 14 has a head portion 16 from the outer periphery of which depend a number of spaced resilient flanges 18 forming an elastic skirt around the piston body between the piston body and the piston head. The lower edges of flanges 18 cooperate with a peripherally extending shoulder on body 14 to define a groove within which the flange 20 of the L shaped closed fire ring 22 is adapted to be seated. It is apparent that fire ring 22 can be assembled with the piston by slipping fire ring 22 down over head portion 16, and forcing the ring over elastic flanges 18 which give inwardly toward the body 14. When ring flange 22 gets below the lower edges of flanges 18, the latter flanges snap back into their original position and secure the ring 18 in place. Of course, flanges 18 are integrally formed with head portion 16 and are deformed only within their elastic limits so that they will snap back in place after the ring 22 has been seated in the groove.

It is therefore apparent that the objects of the invention are achieved in that a single-piece integral piston can be provided with a closed non-split fire ring. No necessity exists for forming the piston in more than one piece, or of taking the piston apart, in order to affix the fire ring to the piston.

Having now described the means by which the objects of the invention are obtained, we claim:

1. A piston for an internal combustion engine comprising a piston body, a head member for said body and cooperating therewith to define a groove extending peripherally of said body, a closed fire ring member having a non-conforming shape with respect to said head member, and at least one of the two named members being deformable within its elastic limit into conformity with the shape of the other member whereby one member may be slipped over the other to seat said ring member in said groove.

2. A piston for an internal combustion engine comprising a piston body of circular section, a piston head of non-circular section, a peripherally extending circular groove in said body between said head and said body, and a closed circular fire ring seated in said groove and deformable within its elastic limit to the shape of said head whereby said ring when deformed can be slipped over said head.

3. A piston as in claim 2, said piston head being of oval shape.

4. A piston as in claim 2, said piston head having an elliptical shape.

5. A piston for an internal combustion engine comprising a piston body, a peripherally extending shoulder on said body, a piston head, a resilient skirt depending from the periphery of said head and cooperating with said shoulder to form a groove, and a closed fire ring having a diameter less than the diameter of said skirt and seated in said groove, said skirt being deformable within its elastic limit to permit passage of said ring over said head into said groove.

6. A piston as in claim 5, said skirt comprising a plurality of spaced resilient flanges.

7. A piston as in claim 5, said ring being composed of an annular member and an inwardly extending flange, said flange having a diameter less than that of said skirt.

8. A piston as in claim 2, said fire ring being composed of an annular member and an inwardly extending flange, said flange having a diameter less than the major axis of said head.

9. A piston for an internal combustion engine comprising a piston body, a head member for said body and cooperating therewith to define a groove extending peripherally of said body, a closed fire ring member, and at least one of the two named members being deformable within its elastic limit into conformity with the shape of the other member whereby one member may be slipped over the other to seat said ring member in said groove.

MANFRED GERLACH.
WALTER GERECKE.